US005685984A

United States Patent [19]

Smith

[11] Patent Number: 5,685,984

[45] Date of Patent: Nov. 11, 1997

[54] FIBER SUSPENSION THICKENER HAVING IMPROVED DISCHARGE CONSISTENCY

[75] Inventor: Ryan M Smith, Lawrenceville, Ga.

[73] Assignee: Tetra Laval Holdings & Finance Alfa Laval AB S.A., Pully, Switzerland

[21] Appl. No.: 444,607

[22] Filed: May 19, 1995

[51] Int. Cl.[6] .............................. D21C 9/06; B01D 33/11
[52] U.S. Cl. ...................... 210/402; 162/311; 162/314
[58] Field of Search ............................ 210/402–404; 162/311–314, 321, 323–329

[56] References Cited

U.S. PATENT DOCUMENTS

| | | | |
|---|---|---|---|
| 3,002,627 | 10/1961 | Morehouse | 210/402 |
| 3,726,510 | 4/1973 | Davis et al. | 210/402 |
| 4,105,563 | 8/1978 | Kosonen | 210/402 |
| 5,266,168 | 11/1993 | Suica | 210/402 |

*Primary Examiner*—Thomas G. Wyse
*Attorney, Agent, or Firm*—Troutman Sanders LLP; Joel S. Goldman; Gerald R. Boss

[57] ABSTRACT

The present invention introduces a fiber suspension thickener, particularly adapted for thickening cellulose fiber. The thickener comprises a vat; a hollow filter assembly in the form of a horizontal cylindrical drum disposed within the vat, whereby the drum may be rotated by a motor around its horizontal axis, and whereby the cirumferential walls of the drum are made of a filter material; either a spray nozzle or some other supply conduit that furnishes a fiber suspension into the interior of the vat, so that the drum becomes submerged within a pool of the fiber suspension; a discharge outlet for discharging the fiber suspension on the ascending side of the rotating drum; and a turbulence creating device, that can take many forms, for creating turbulence and mixing the fiber suspension on the ascending side of the rotating drum. The turbulence creating device prevents coarse fibers within the fiber suspension from caking or matting on the exterior of the filter material of the drum, and improves the overall thickening capability of the present invention.

22 Claims, 7 Drawing Sheets

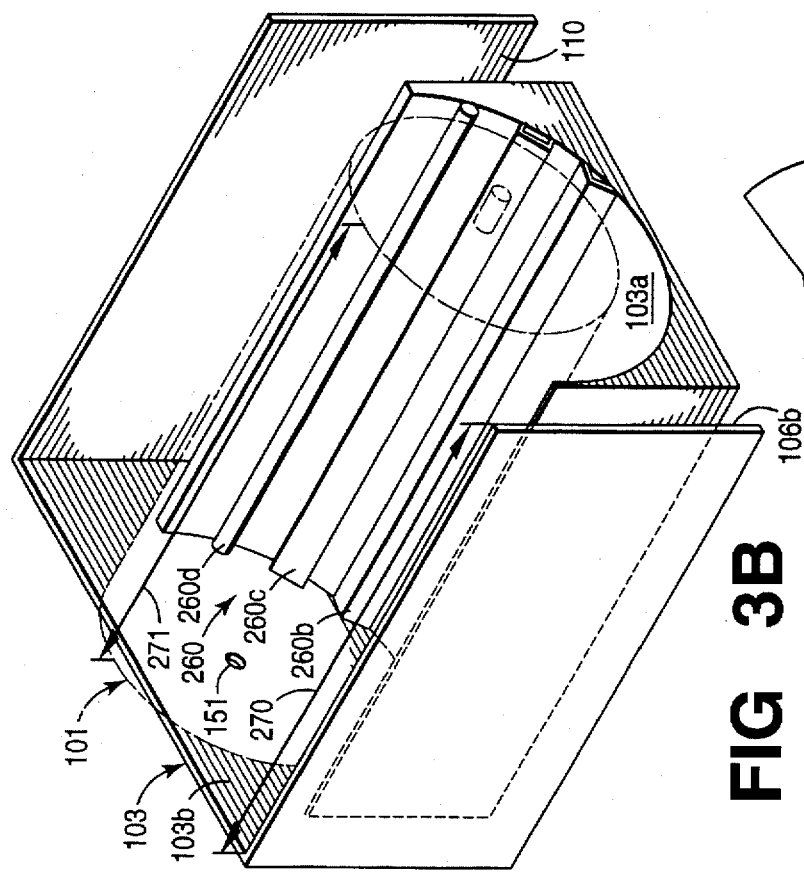
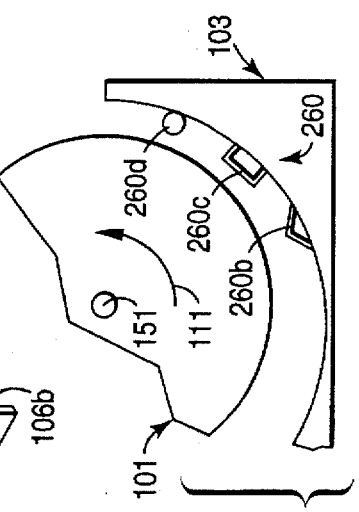
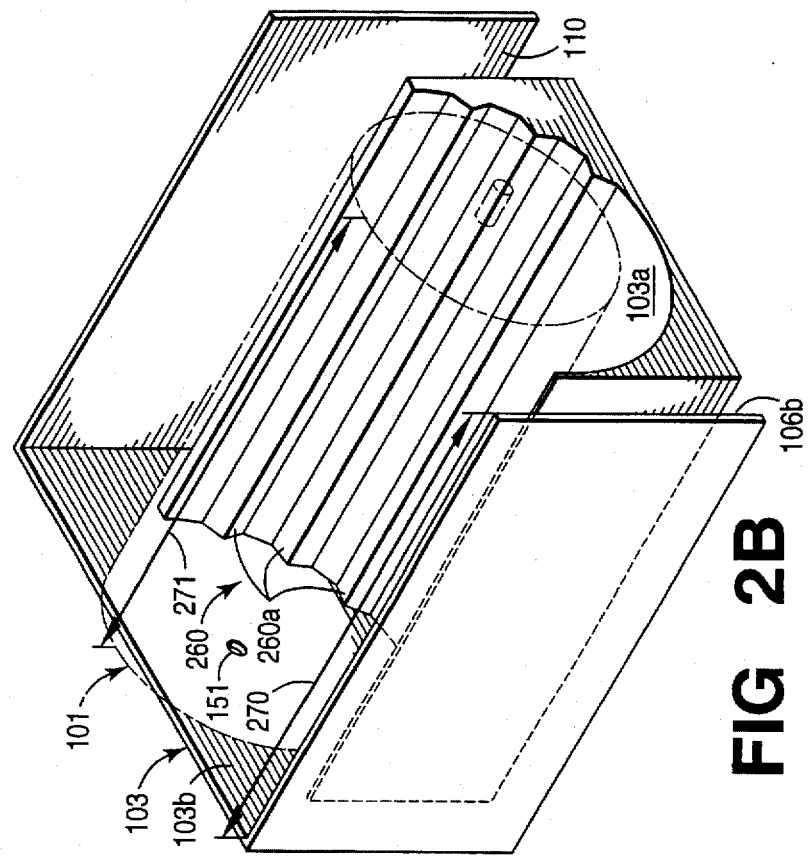
FIG 3B
FIG 3A
FIG 2B

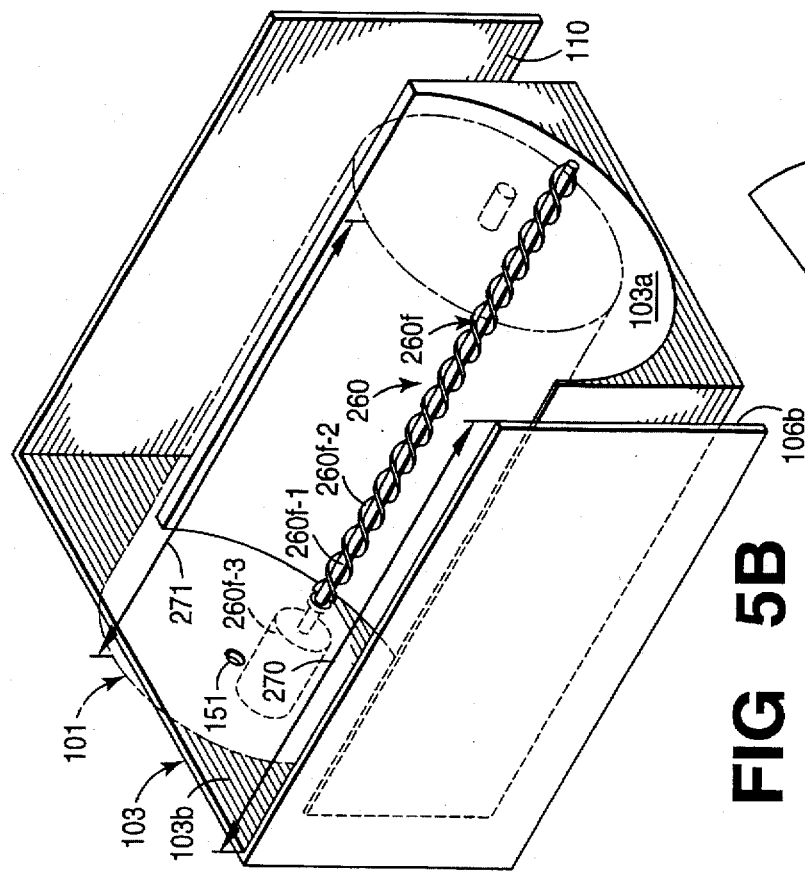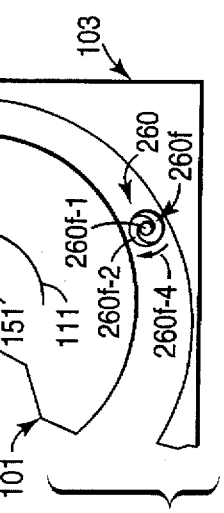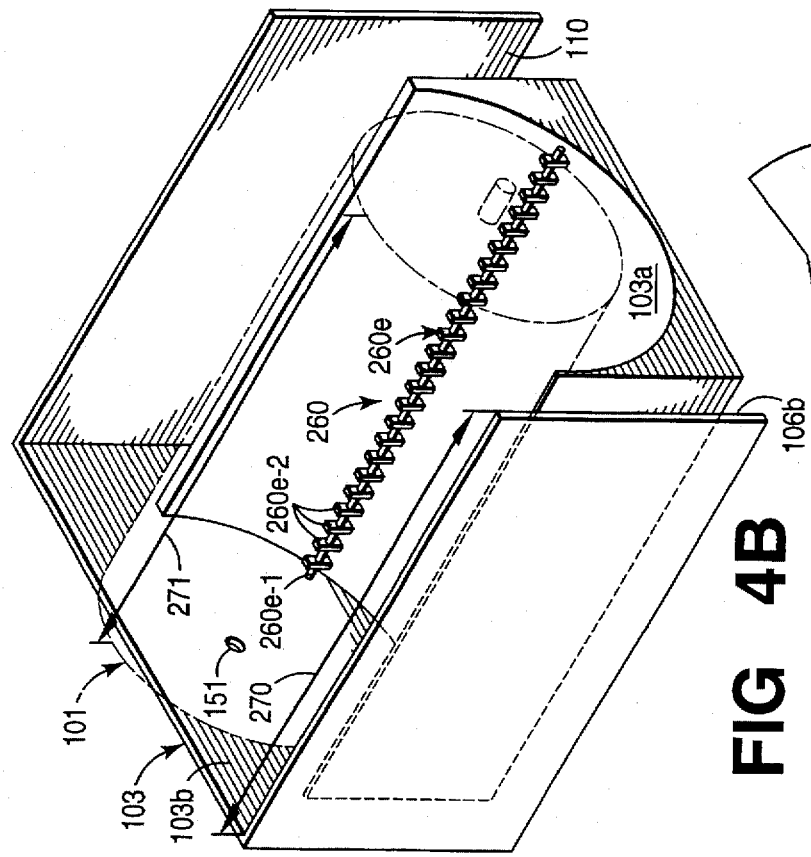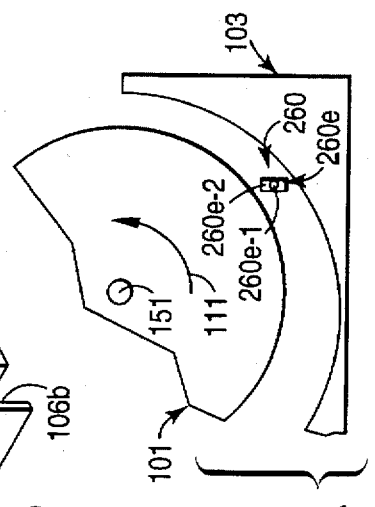

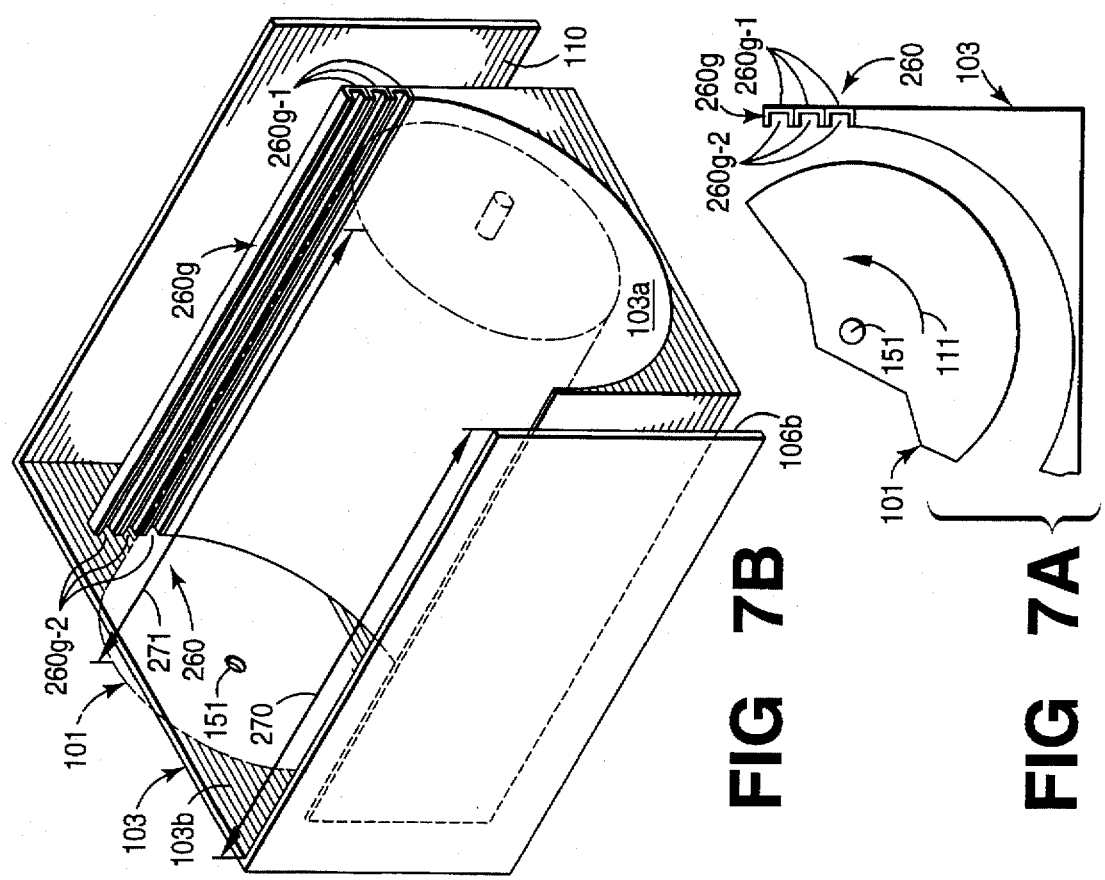
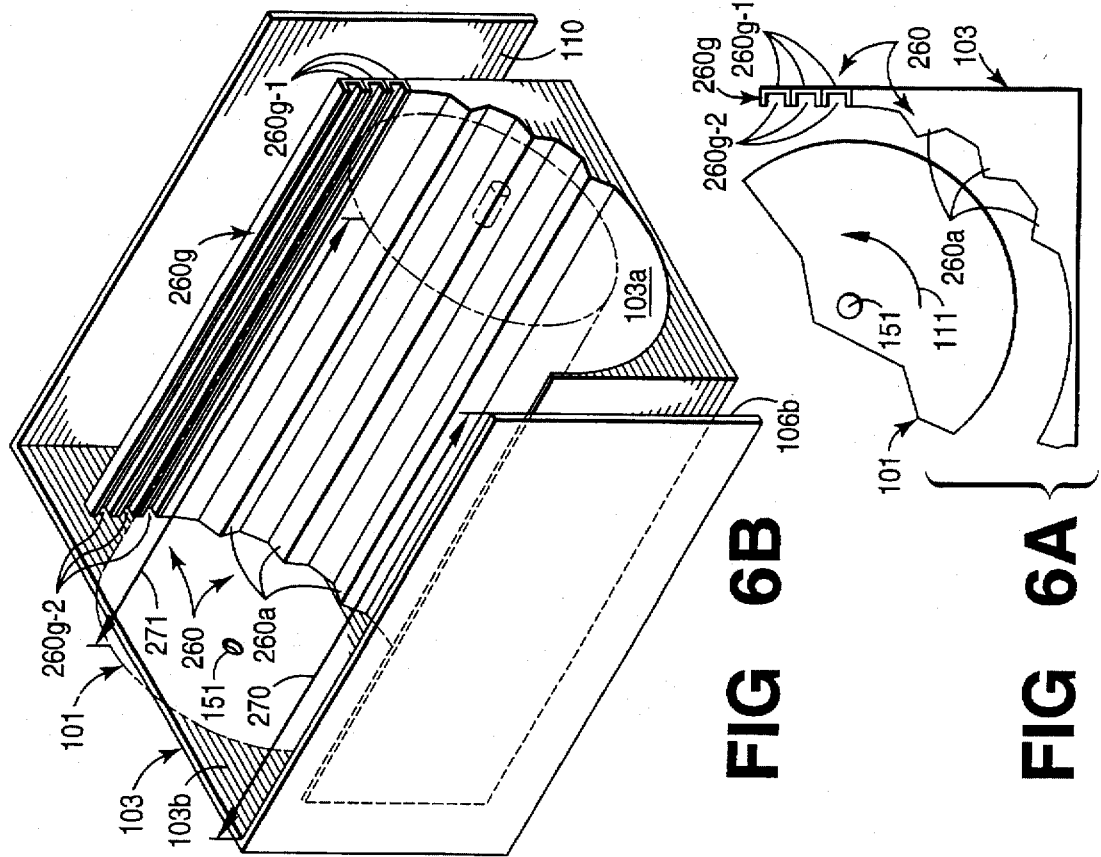

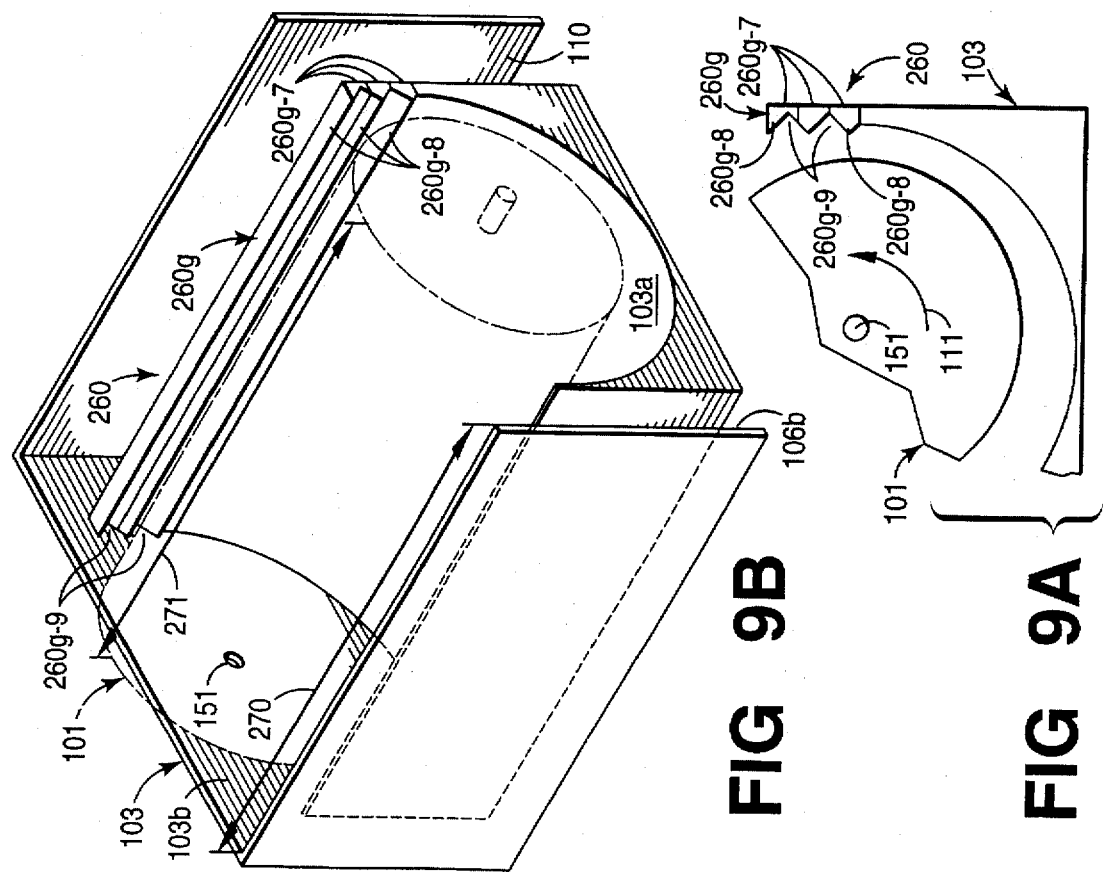
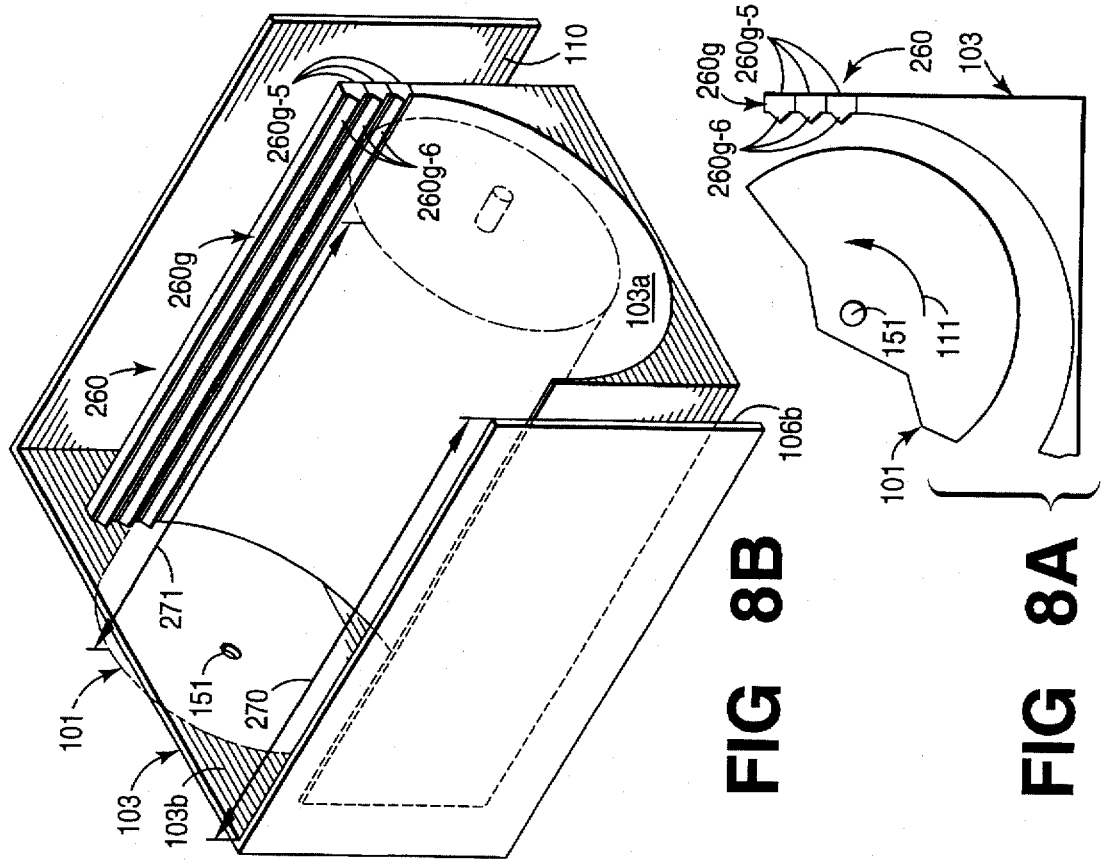

1

FIBER SUSPENSION THICKENER HAVING IMPROVED DISCHARGE CONSISTENCY

FIELD OF THE INVENTION

The present invention relates to a device for thickening a fiber suspension, such as a cellulose slurry, through the use of a hollow filter assembly disposed within a vat containing the suspension.

BACKGROUND OF THE INVENTION

FIG. 1 depicts a conventional drum gravity thickener that may be used to thicken a fiber suspension, such as a cellulose slurry (pulp stock). A hollow filter assembly in the form of a horizontal cylindrical drum 101 is disposed within a vat 103, whereby the drum 101 may be rotated about a horizontal axis 151 through the use of a motor 152 in drivable engagement with the drum 101 via gear assembly 153. The drum 101 includes around its circumference walls made of a filter material 102. The direction of rotation of the drum 101 is indicated in FIG. 1 by an arrow 111. The interior 118 of the drum 101 includes an outlet 154 for discharging the suspension (filtrate) (162) that forms within the interior 118 of the drum 101.

Fiber suspension is supplied to the drum filter 101 and the vat 103 by means of a spray nozzle 106a or a conduit 106b, or both. At the same time, the drum 101 is rotated about its axis 151, as described previously. As the fiber suspension is sprayed from the spray nozzle 106a and/or supplied through the conduit 106b, a pool 161 of fiber suspension accumulates in the vat 103 outside the drum 101 and the drum 101 becomes at least partially submerged in the pool 161. Due to the hydrostatic pressure exerted on the fiber suspension 161 by gravity, a portion 162 of the fiber suspension 161 (including water, fine particles, etc.) is forced through the filter material 102 of the drum 101 and into the interior 118 of the drum.

Because of the filtering action of the filter material 102, the resulting fine fraction 162 within the interior 118 of drum 101 contains relatively few coarse (large) fibers. As the fine particles and water pass through the filter material 102, the fiber suspension 161 remaining on the outside of the filter material 102 thereby becomes thicker as the water and fine particles pass into the interior 118 of the drum, while coarse fibers remain in the fiber suspension 161.

Moreover, as the fiber suspension 161 is forced by hydrostatic pressure against the filter material 102, coarse fibers that are too large to pass through the filter material 102 create a dewatered mat 169 (or cake) on the exterior surface 102a of the filter material 102 of the drum 101. The creation of tight dewatered mat 169 gives rise to diminishing fine fraction flow into the drum 101, as depicted in FIG. 1 by arrows 163a and 163b. Due to the counterclockwise rotation of the drum 101 about its axis 151, along with the constant hydrostatic pressure exerted by the fiber suspension 161, the fiber suspension 161 becomes thicker as the filter material 102 is displaced through the fiber suspension 161. As the filter material 102 travels from its descending side 102b to its ascending side 102c, the fiber suspension 161 generally continues to thicken. Eventually, the thickened fiber suspension 161 travels to the overflow conduit 110a of discharge outlet 110 (at predetermined level 110b), and may be carried out of the vat 103 for further processing (not shown).

The approximate relative consistencies of the fiber suspension 161 in various locations within the vat 103 are indicated by the following reference numerals: low consistency (0.5%) 161a, medium consistency (1.5%) 161b, medium high consistency (3–5%) 161c, and high consistency (10%) 161d. The percentages indicate an approximate percent consistency. As arrows 163a indicate, the fiber suspension 161 in proximity to the filter material 102 travelling in its descending side 102b is, overall, of a relatively low consistency such that hydrostatic pressure acting on the fiber suspension 161 causes a relatively large volume of water and fine particles to pass through the filter material 102 into the interior 118 of the drum 101. In contrast, because the fiber suspension 161 continues to thicken and a thicker and denser mat forms on the filter material 102 as it travels from its descending side 102b to its ascending side 102c, less and less water and fine particles within the fiber suspension 161 are allowed to pass through the filter material 102 (depicted by shorter arrows 163b). As a result, water and fine particles within the portion of the fiber suspension 161 close to the interior wall 103a of the vat 103 remain. The fiber suspension 161 near the exterior surface 102a of the filter material 102 as it travels in its ascending side 102c becomes thicker (e.g., a high consistency 161d), but the portion of the fiber suspension 161 that reaches the overflow 110a and spills over into the discharge outlet 110 remains at only a medium high consistency 161c.

Thus, there exists a need in the art for an improved thickening system that overcomes the disadvantages discussed above, as well as other disadvantages. As described below, these and other shortcomings are effectively overcome by the teachings of the present invention.

SUMMARY OF THE INVENTION

The present invention introduces a fiber suspension thickener, particularly adapted for thickening cellulose fiber. The thickener comprises a vat; a hollow filter assembly in the form of a horizontal cylindrical drum disposed within the vat, whereby the drum may be rotated by a motor around its horizontal axis, and whereby the cirumferential walls of the drum are made of a filter material; either a spray nozzle or some other supply conduit that furnishes a fiber suspension into the interior of the vat, so that the drum becomes submerged within a pool of the fiber suspension; a discharge outlet for discharging the fiber suspension on the ascending side of the rotating drum; and a turbulence creating device, that can take many forms, for creating turbulence and mixing the fiber suspension on the ascending side of the rotating drum. The turbulence creating device prevents coarse fibers within the fiber suspension from caking or matting on the exterior of the filter material of the drum, and improves the overall thickening capability of the present invention.

SUMMARY OF THE DRAWINGS

FIGS. 2A, 2B, 3A, 3B, 4A, 4B, 5A, 5B, 6A, 6B, 7A, 7B, 8A, 8B, 9A, and 9B depict various embodiments of the thickener of the present invention, including various embodiments of a turbulence creating (mixing) device used therein.

DETAILED DESCRIPTION OF THE INVENTION

Figure 1:
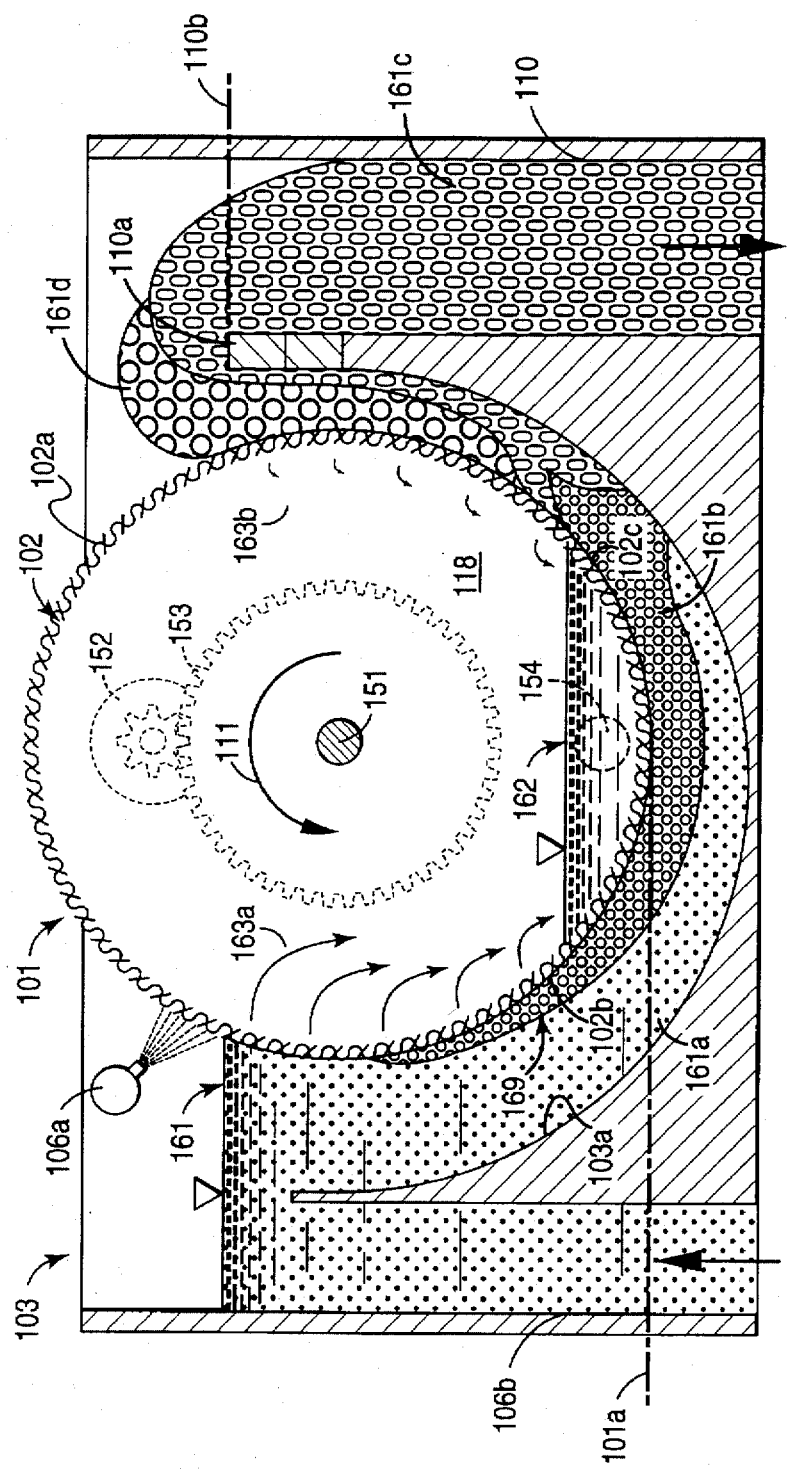
FIG. 1 depicts a conventional thickener for thickening a fiber suspension, such as a cellulose slurry.

FIGS. 2A and 2B, 3A and 3B, 4A and 4B, 5A and 5B, 6A and 6B, 7A and 7B, 8A and 8B, and 9A and 9B illustrate side views and three-dimensional perspective views, respectively, of a thickener according to various embodiments of the present invention. For purposes of the description of the present invention below, like-numbered reference numerals used in the various figures correspond to identical or analogous components.

As with the prior art thickener of FIG. 1, the present invention depicted in FIGS. 2A through 9B may include a horizontal drum 101 disposed within a vat 103, whereby the drum 101 may be rotated about a horizontal axis 151 through the use of a motor 152 in drivable engagement with the drum 101 via gear assembly 153. Again, the drum 101 includes around its circumference walls made of a filter material 102, and the direction of rotation of the drum 101 is indicated by an arrow 111. The interior 118 of the drum 101 includes an outlet 154 for discharging the suspension and/or liquid (162) that forms within the interior 118 of the drum 101.

Figure 10:
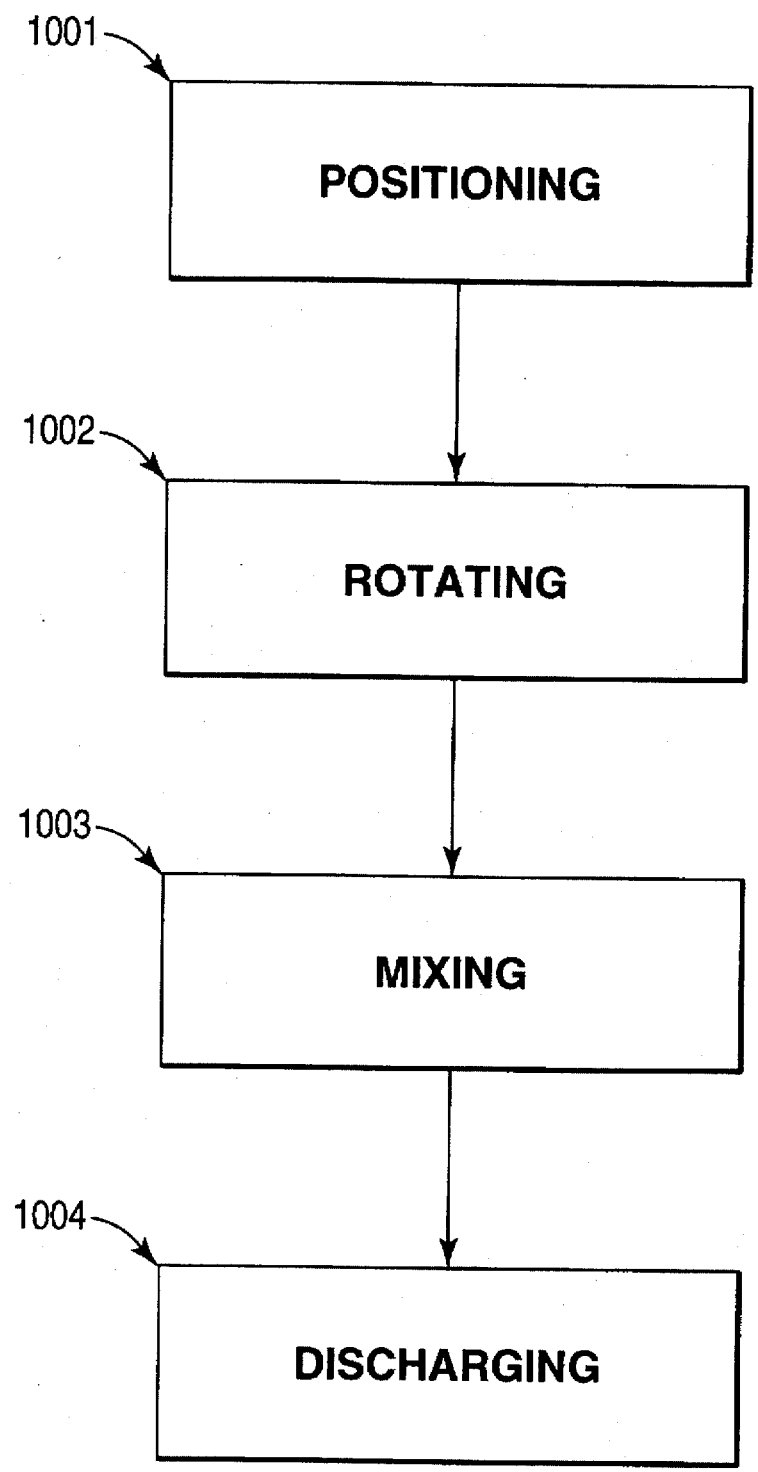
FIG. 10 depicts a process for implementing the thickening features of the present invention.

Also, like the prior art thickener, fiber suspension may be supplied to the drum filter 101 and the vat 103 by means of a spray nozzle 106a or a conduit 106b, or both. As the drum 101 is rotated about its axis 151, the fiber suspension is sprayed from the spray nozzle 106a and/or supplied through the conduit 106b, and a pool 161 of fiber suspension accumulates in the vat 103 outside the drum 101. Due to the hydrostatic pressure from gravity exerted on the fiber suspension 161, a portion 162 of the fiber suspension 161 (including water, fine particles, etc.) passes through the filter material 102 of the drum 101 and into the interior 118 of the drum 101. The above initial steps of the process of the present invention are depicted as step 1001 in FIG. 10.

As with FIG. 1, because of the filtering action of the filter material 102 in FIGS. 2A through 9B, the resulting fine fraction 162 within the interior 118 of drum 101 contains relatively few coarse (large) fibers. As the fine particles and water pass through the filter material 102 into the interior 118 of the drum 101, the fiber suspension 161 remaining on the outside of the filter material 102 thereby becomes thicker, while coarse fibers remain in the fiber suspension 161.

Additionally, like FIG. 1, as the fiber suspension 161 is forced by hydrostatic pressure against the filter material 102 in FIGS. 2A through 9B, coarse fibers that are too large to pass through the filter material 102 initially create a de-watered mat 169 (or cake) on the exterior surface 102a of the filter material 102 of the drum 101. Again, due to the counterclockwise rotation 111 of the drum 101 about its axis 151, along with the continuous loss of liquid into the interior 118 of the drum 101, the fiber suspension 161 becomes thicker as it moves through the vat 103. The above steps are depicted as step 1002 in FIG. 10.

As the fiber suspension travels from the descending side 102b to the ascending side 102c of the drum 101, the fiber suspension 161 generally continues to thicken. Eventually, the thickened fiber suspension 161 travels to the overflow 110a of discharge outlet 110, and is carried out of the vat 103 for possible further processing.

In addition to the components of the thickener described above with respect to FIGS. 2A through 9B (which generally correspond to like-numbered components of the prior art thickener of FIG. 1), the present invention also includes a turbulence creating device 260 (or devices) within the vat 103 (and outside the drum 101) in proximity to the ascending side 102c of the filter material 102. The turbulence creating device 260, which may be implemented simply and inexpensively, is designed to mix the fiber suspension 161 within the vat so as to avoid the fiber suspension discharge consistency problems associated with the prior art thickener of FIG. 1. In one embodiment, the turbulence creating device 260 may be located closer to predetermined level 110b than to the lowest part 101a of drum 101. The above steps are depicted as step 1003 in FIG. 10.

Particularly, as previously described in FIG. 1, the fiber suspension 161 in proximity to the ascending side 102c of the filter material 102 generally separates into two portions, with a medium high consistency portion 161c forming near the interior wall 103a of the vat 103, and a high consistency portion 161d forming near the exterior surface 102a of the filter material 102. Again, this undesired result causes a medium high consistency 161c, rather than a high consistency 161d, of the fiber suspension 161 to spill over into the discharge outlet 110.

Again, as with FIG. 1, and as arrows 263a indicate, the fiber suspension 161 in proximity to the filter material 102 travelling in its descending side 102b is, overall, of a relatively low consistency 261a such that hydrostatic pressure acting on the fiber suspension 161 causes a relatively large volume of water and fine particles to pass through the filter material 102 into the interior 118 of the drum 101. However, unlike the prior art thickener of FIG. 1, a thicker and denser mat does not continue to form (at least not to the same extent as in FIG. 1) as the filter material 102 travels along the ascending side 102c of the drum 101. Rather, in accordance with the teachings of the present invention, the fiber suspension 161 in proximity to the ascending filter material 102 may be mixed, or otherwise agitated, with the mat 169 by a turbulence creating device 260 so that the various consistencies within the fiber suspension 161 are made more uniform.

Figure 2A:
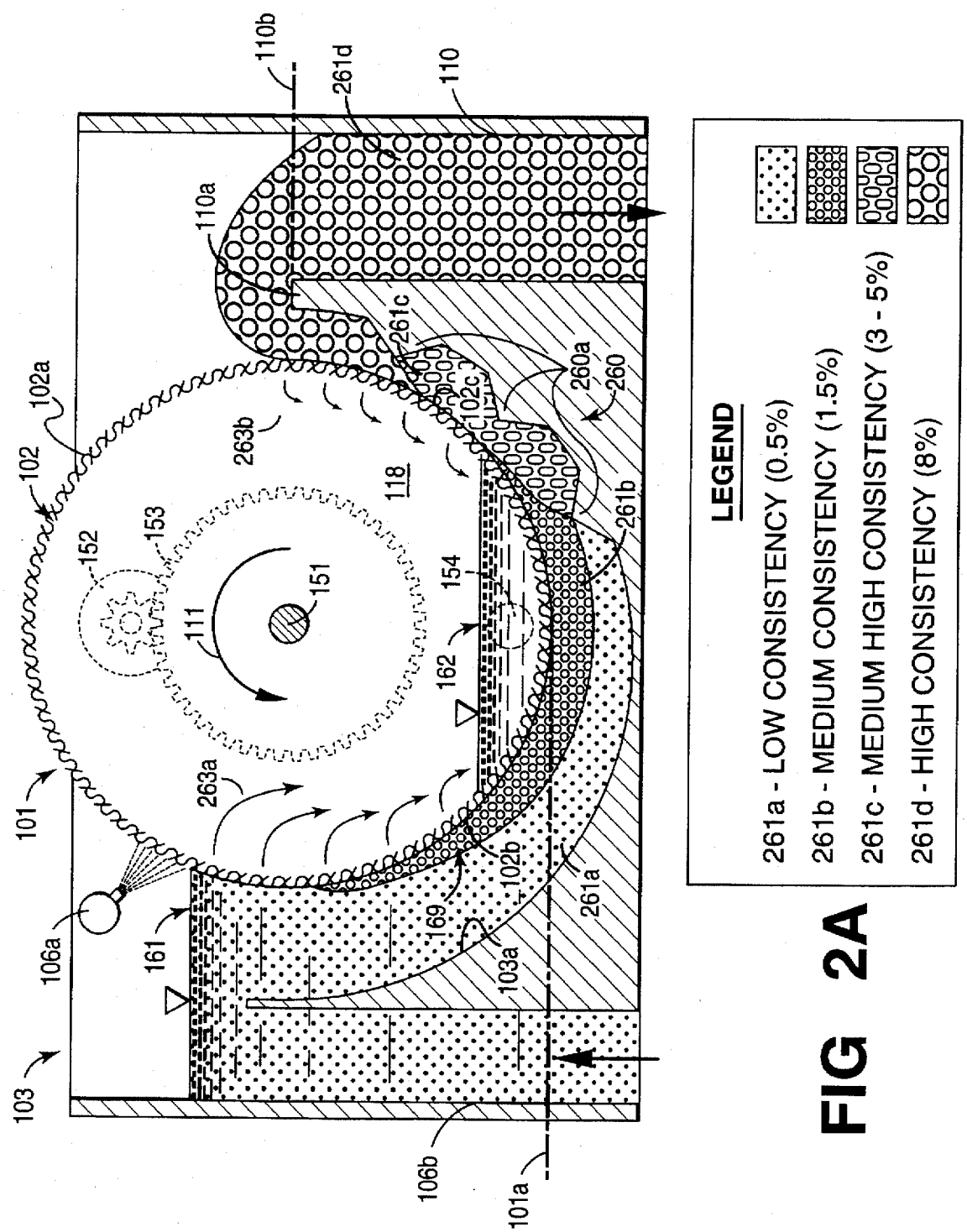

Thus, instead of a high consistency suspension 161d forming near the exterior surface 102a of the ascending filter material 102c while a medium high consistency suspension 161c forms near the interior 103a of vat 103 (eventually being discharged into discharge outlet 110) (as shown in prior art FIG. 1), the thickener configuration of the present invention causes the fiber suspension to be more evenly dispersed near the ascending side 102c of the drum 101, resulting in a more even distribution of fiber suspension 161 in proximity to side 102c. A thick fiber mat does not form on the exterior surface 102a of filter material 102 (shown in FIG. 1 as 161d), but instead a medium high consistency suspension 261c is dispersed fairly evenly in the vat 103 outside the drum 101. As shown in FIG. 2A, and equally applicable to FIGS. 2B and 3A through 9B, arrows 263b are of only slightly smaller length (or even equal length) as arrows 263a, indicating that more water and fine particle are allowed through on the ascending side 102c in FIGS. 2A through 9B, than on the ascending side 102c in FIG. 1. Thus, in FIGS. 2A through 9B, by the time the fiber suspension 161 reaches the discharge outlet 110, more water and fine particles have been removed than in the prior art thickener, resulting in a higher consistency suspension 261d reaching the discharge outlet 110. The above steps are depicted as step 1004 in FIG. 10.

The increase in thickening or consistency of the fiber suspension pulp 161 achieved by the present invention is quite beneficial to pulp and paper manufacturers because it is less difficult and costly to store thickened pulp, because it has a smaller volume than before it is thickened. Thickened fiber suspension also costs less to bleach—less bleaching chemicals are required because there is less fiber suspension to dilute the bleaching chemicals. Furthermore, the thickened fiber suspension of the present invention is generally cleaner as fine contaminants are removed along with water.

Additionally, because of the smaller volume of the thickened fiber suspension, equipment that handles the thickened suspension may be made smaller and less expensive.

The approximate relative consistencies of the fiber suspension 161 in various locations within the vat 103 in FIGS. 2A through 9B are indicated by the following reference numerals: low consistency (0.5%) 261a, medium consistency (1.5%) 261b, medium high consistency (3–5%) 261c, and high consistency (8%) 261d. These reference numerals are essentially the same as the corresponding reference numerals in FIG. 1 (e.g., 161a, 161b, 161c, 161d), except that the high consistency fiber suspension 261d in FIGS. 2A through 9B indicates a slightly lower consistency than the high consistency fiber suspension 161d in FIG. 1. This slight discrepancy is based upon a more uniform, although possibly slightly lower consistency, of higher consistency suspension 261d that reaches the discharge outlet 110 in FIGS. 2A though 9B, in contrast to the medium high consistency suspension 161c that travels to the discharge outlet 110 in the prior art thickener of FIG. 1. In FIG. 1, the high consistency suspension 161d generally never reaches the discharge outlet 110, because it is diluted by lower consistency fiber. In any event, the overall consistency of the fiber suspension 161 that reaches the discharge outlet 110 in the present invention of FIGS. 2A through 9B is noticeably higher than that of prior art thickeners, including that depicted in FIG. 1.

FIGS. 2A through 9B depict a sampling of the various turbulence creating devices 260 that may be used for purposes of the present invention. FIGS. 2A through 9B are grouped together in pairs, whereby a numbered figure with a suffix of "A" illustrates a cut-away side view of the thickener, and the corresponding numbered figure with a suffix of "B" illustrates a three-dimensional cut-away perspective view of the same thickener. One of ordinary skill in the art will readily recognize that the various embodiments of the present invention depicted in FIGS. 2A through 9B represent merely a handful of the multitude of ways that the present invention may be implemented.

For example, FIGS. 2A and 2B illustrate turbulence devices in the form of angled projections 260a positioned along the interior wall 103a of the vat 103. In one embodiment, the angled projections 260a may be integrally molded into the vat 103, or they may be separate components attached to the interior wall 103a of the vat 103. Additionally, the angled projections 260a may be formed of the same type of material used to form the vat 103, or any other suitable material.

As shown in FIG. 2B, the angled projection 260a may preferably extend along the entire horizontal length 270 of the interior wall 103a of the vat 103, which may be substantially the same or greater than the horizontal length 271 of the drum 101. Of course, the angled projections 260a will work at other lengths as well (such as less than the length 271 of the drum 101), and need not necessarily be positioned horizontally.

FIGS. 3A and 3B depict another embodiment of the turbulence creating device 260. In FIGS. 3A and 3B, three different types of projections 260b, 260c and 260d are provided having various shapes and sizes. Again, these projections may be formed of any suitable material.

Projection 260b may be fashioned as an angled projection similar in size to angled projection 260a (FIGS. 2A and 2B), although it may be hollow inside. Similarly, projection 260c may be fashioned in the form of a cube or other hexahedron, and projection 260d may be fashioned in the shape of a cylinder. As with the angled projection 260a of FIGS. 2A and 2B, projections 260b, 260c and 260d may extend the entire horizontal length 270 of the vat 103, may extend the entire horizontal length 271 of the drum 101, may extend to any other suitable length, or may not be horizontal at all.

FIGS. 4A and 4B depict yet another embodiment of turbulence creating device 260. In FIGS. 4A and 4B, turbulence creating device 260 may take the form of a stationary member 260e attached to the end walls 103b (only one side of which is shown) of the vat 103. As illustrated in FIG. 4B, in this case the stationary member 260e is not attached to the interior wall 103a of the vat, but of course such a configuration is possible.

The stationary member 260e may include a rod 260e-1 extending along the horizontal (or a non-horizontal) length 270 of the vat 103. In one embodiment, the rod 260e-1 may include one or more vertical members 260e-2 disposed thereon. In another embodiment (not particularly shown), the rod 260e-1 may simply be a solid hexahedron (or any other suitable shape) without the attached vertical members 260e-2. Additionally, the rod may be fashioned out of any suitable material.

In FIGS. 5A and 5B, the turbulence creating device 260 may take the form of a rotating screw mechanism 260f (impeller). The rotating screw mechanism 260f may include a rod 260f-1 with helical screw blades 260f-2 attached thereto, as well as a motor 260f-3 attached to the rod 260f-1 for rotating the screw 260f-1/260f-2. As shown in FIG. 5A, the screw may be rotated in a clockwise direction when viewed from the side (indicated by arrow 260f-4), but of course any suitable direction would suffice. In this embodiment, the drum 101 rotates counter-clockwise (arrow 111), while the screw 260f-1/260f-2 rotates clockwise.

FIGS. 6A, 6B, 7A, 7B, 8A, 8B, 9A and 9B illustrate various embodiments of turbulence creating devices 260, all of which include projections and indentations on a weir 260g (dam) coupled to the vat, separating the interior of the vat 103 from the discharge outlet 110. In FIGS. 6A and 6B, the weir 260g is formed of three (or any other suitable number) U-shaped pieces 260g-1 positioned to run the length 270 of the interior wall 103a of the vat 103. The U-shaped pieces 260g-1 are stacked on top of one another as shown, with their interior indentations 260g-2 facing toward the drum 101. The weir 260g may be formed of any suitable material, and in another embodiment, may be formed integrally with the vat 103.

FIGS. 6A, 6B, 7A and 7B both depict the weir 260g as described above, except that FIGS. 6A and 6B also include the angled projections 260a described previously with respect to FIGS. 2A and 2B. In contrast, FIGS. 7A and 7B depict the weir 260g without the angled projections 260a. Both of these embodiments are provided in order to illustrate that the various embodiments of the turbulence creating device 260 shown in FIGS. 2A through 9B may be readily mixed and matched in various configurations in order to achieve the objectives of the present invention.

FIGS. 8A, 8B, 9A and 9B illustrate additional embodiments of the turbulence creating device 260 in the form of a weir 260g. In FIGS. 8A and 8B, a weir 260g is provided including pieces 260g-5 having angled projections 260g-6 extending therefrom toward the drum 101. In FIGS. 9A and 9B, a weir 260g is provided including pieces 260g-7 having angled projections 260g-8 (ridges) and angled indentations 260g-9 (valleys). Like FIGS. 6A through 7B, the weirs 260g of FIGS. 8A through 9B may extend along the horizontal length 270 of the interior wall 103a of the vat (or may extend along any other horizontal or non-horizontal length—such as length 271).

It will be readily apparent to one of ordinary skill in the art that the turbulence creating devices 260 shown in FIGS. 2A through 9B are but a few of the devices that may be used to agitate or mix the fiber suspension 161 in proximity to the ascending side 102c of the filter material 102. Other devices, either stationary or moving, may also be used to create turbulence or to mix the fiber suspension so as to achieve the ends of the present invention.

I claim:

1. A device for thickening a fiber suspension comprising:
   (a) a vat;
   (b) a hollow filter assembly disposed within said vat and including walls composed of a filter material;
   (c) means for rotating said hollow filter assembly about a horizontal axis;
   (d) supply means for furnishing the fiber suspension to be thickened to the vat at the descending side of said hollow filter assembly, thereby forming a pool of fiber suspension in which said hollow filter assembly partly submerges, whereby gravity forces water and fine particles within the fiber suspension through the filter material and into the interior of said hollow filter assembly, thereby creating a thickened fiber suspension in the vat;
   (e) discharge means for discharging thickened fiber suspension from said vat at the ascending side of said hollow filter assembly; and
   (f) a turbulence creating means disposed within said vat outside of and at the ascending side of said hollow filter assembly for creating sufficient turbulence within the flow of said fiber suspension as said fiber suspension flows from said supply means to said discharge means for displacing a portion of said fibers congregating on said filter on the ascending side of said hollow filter assembly from said filter into said filter suspension for subsequent discharge by said discharge means; whereby a portion of said fibers which accumulate on said filter are returned into suspension for discharge thereby increasing the efficiency of the thickening process and the overall thickness of said fiber suspension for subsequent use.

2. The device of claim 1, wherein said discharge means comprises an overflow conduit coupled to said vat for receiving the thickened fiber suspension.

3. The device of claim 1, wherein said turbulence creating means is positioned between said vat and the exterior of said hollow filter assembly.

4. The device of claim 3, wherein said turbulence creating means comprises a stationary member.

5. The device of claim 3, wherein said turbulence creating means comprises a rotating impeller.

6. The device of claim 5, wherein the impeller is adapted to rotate in a direction opposite the direction of rotation of the drum.

7. The device of claim 1, wherein said turbulence creating means is positioned on said vat.

8. The device of claim 7, wherein said turbulence creating means comprises a weir including an indentation disposed therein.

9. The device of claim 8, wherein the indentation is in the form of a groove.

10. The device of claim 9, wherein the groove is parallel with the horizontal axis of said hollow filter assembly.

11. The device of claim 10, wherein the groove is at least as long as said hollow filter assembly along said horizontal axis.

12. The device of claim 7, wherein said turbulence creating means comprises at least one projection into the interior of said vat.

13. The device of claim 12, wherein the projection is elongated.

14. The device of claim 13, wherein the projection is parallel with the horizontal axis of said hollow filter assembly.

15. The device of claim 14, wherein the projection is at least as long as said hollow filter assembly along said horizontal axis.

16. The device of claim 7, wherein said turbulence creating means comprises a weir including indentations and projections disposed therein.

17. The device of claim 7, wherein said turbulence creating means comprises a weir including ridges and valleys disposed therein.

18. The device of claim 1 wherein said discharge means is adapted to discharge said thickened suspension at a predetermined level in said vat, said turbulence creating means positioned near said discharge means for removing a portion of fibers which have collected on said filter and returning said fibrous portions back to said thickened suspension prior to discharging.

19. The device of claim 18 wherein said turbulence creating means is adapted to mix at least a portion of the fiber suspension located in close proximity to said predetermined level.

20. A device for thickening a fiber suspension comprising:
   (a) a vat;
   (b) a hollow filter assembly disposed within said vat and including walls composed of a filter material;
   (c) means for rotating said hollow filter assembly about a horizontal axis;
   (d) supply means for furnishing the fiber suspension into said vat;
   (e) an overflow conduit in fluid communication with said vat for receiving said thickened fiber suspension;
   (f) a corregated weir offset from said hollow filter assembly intermediary said overflow conduit and said ascending side of said hollow filter assembly for deflecting a portion of said flow of said fiber suspension toward said hollow filter assembly for dewatering of said suspension by said filter;
   (f) a turbulence creating means disposed within said vat outside of and at the ascending side of said hollow filter assembly for creating sufficient turbulence within the flow of said fiber suspension as said fiber suspension flows from said supply means to said discharge means for displacing a portion of said fibers congregating on said filter on the ascending side of said hollow filter assembly from said filter into said filter suspension for subsequent discharge by said discharge means; whereby a portion of said fibers which accumulate on said filter are returned into suspension for discharge thereby increasing the efficiency of the thickening process and the overall thickness of said fiber suspension for subsequent use.

21. The device of claim 20 wherein said corregated weir includes grooves parallel with the horizontal axis of said hollow filter assembly.

22. The device of claim 20 wherein said turbulence creating means are located beneath said corrugated weir.

* * * * *